Figure 1:
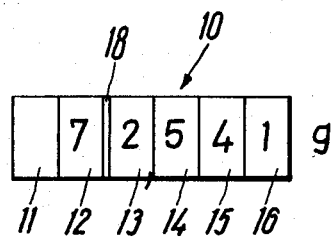

United States Patent [19]
Knothe et al.

[11] 3,754,611
[45] Aug. 28, 1973

[54] COUNTERWEIGHT ADDITION AND REMOVAL DEVICES FOR USE WITH BALANCES

[75] Inventors: Erich Emil Karl Knothe, Gottingen-Geismar; Franz-Josef Melcher, Gottingen-Nikolausberg, both of Germany

[73] Assignee: Sartorius-Werke GmbH, Gottingen, Germany

[22] Filed: June 22, 1972

[21] Appl. No.: 265,285

[30] Foreign Application Priority Data
June 23, 1971 Germany.................. P 21 31 058.7

[52] U.S. Cl. .............................................. 177/235
[51] Int. Cl. .............................................. G01g 1/28
[58] Field of Search.................. 177/1, 235, 237, 177/210, 191

[56] References Cited
UNITED STATES PATENTS
3,477,531  11/1969  Kuhnle........................... 177/237 X Primary Examiner—George H. Miller, Jr.
Attorney—Herbert L. Lerner et al.

[57] ABSTRACT
A counterbalance weight addition or removal device for automatic use with a balance, a control circuit being provided to control the device, which device is arranged to deposit and lift from the balance, a plurality of counter weights in equal weight steps. The balance produces an electrical signal (load analog signal) proportional to the portion of a load on the balance not counterbalanced by counterweights. A digital indicator and four signal generators to receive said electrical signal, two of which signal generators are arranged to produce a signal for actuating the device, to deposit and lift a counterweight when said electrical signal exceeds the limits of a specified range, while the other two signal generators are arranged to produce a control signal when said electrical signal has exceeded the range of a signal equivalent to a counterweight step just completed, by more than the magnitude of that range. First and second delay members are provided whose delay times are longer than the oscillation time of the balance. The first delay member is permanently connected to the input side of the signal generators defining the said specified range, and the second delay member is arranged in the control circuit so as to be operable by the device at the end of each counter weight addition or removal operation to render said device inoperative for the duration of its delay time. The second delay member is also arranged to be rendered inoperative under the influence of a control signal from one of said other signal generators, to thus enable said device to then remain continuously operable.

5 Claims, 5 Drawing Figures

Patented Aug. 28, 1973

3,754,611

2 Sheets-Sheet 1

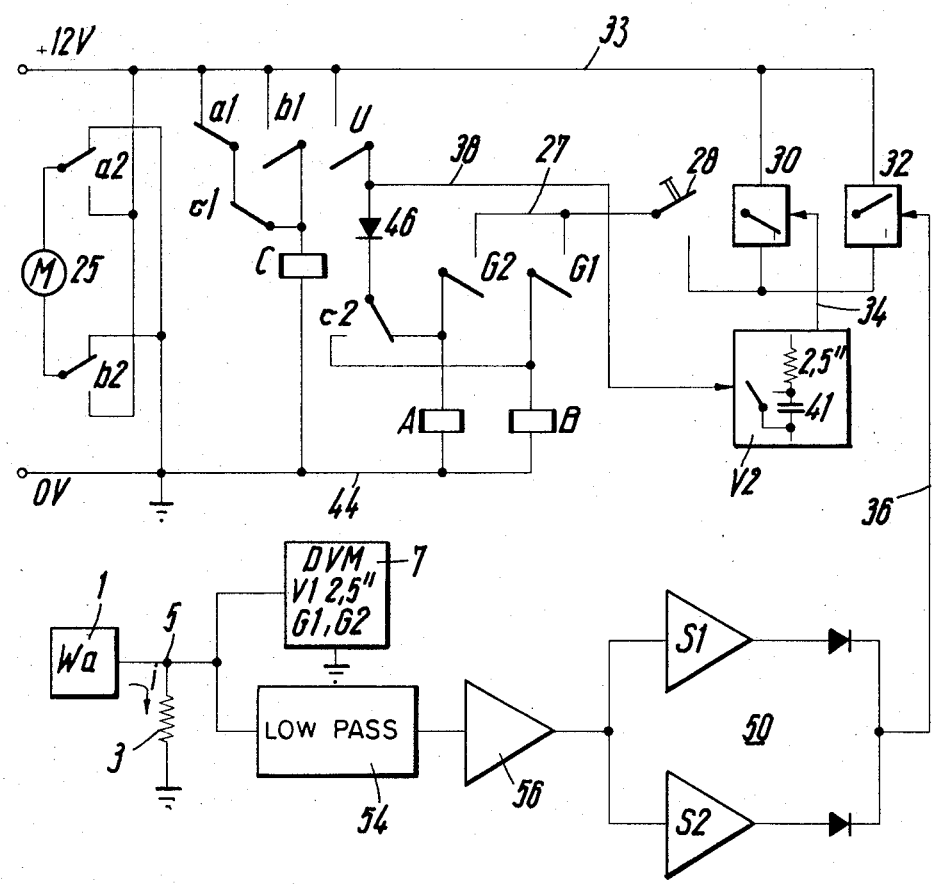

COUNTERWEIGHT ADDITION AND REMOVAL DEVICES FOR USE WITH BALANCES

The present invention relates to a counterbalance weight addition or removal device for automatic use with a balance, which device is controlled by a control circuit and has a plurality of possible counterweight addition or removal steps and produces an electrical signal (load analog signal) dependent on the portion of the load on the balance not counter-balanced by the counterweights and feeds this signal to a digital indicator, signal generators being provided which respond to the said electrical signal and produce signals as soon as a range is exceeded which embraces a counterweight step which has just been completed by the device.

In such a balance, care must be taken that the counterweight addition or removal device commences to deposit or transfer a counterweight only when the measuring member of the balance has come to rest. Otherwise, for example, during overshooting of the range of a counterweight addition or removal step which has just been completed, a useless further counter weight addition or removal operation would be initiated even when the measuring member would remain in its original range after its oscillation had died away. Furthermore, once the device has been put into operation it might actuate further addition or removal operation of weights even after reaching the correct counterweight step corresponding to the load, simply because the measuring member of the balance, due to its inertia, does not stop the device at the correct time.

In a partial realisation of the present invention, these disadvantages can be avoided by using a delay member which renders the counterweight addition or removal device inoperative for a specific delay time after each counterweight addition or removal operation has been effected, the delay time being somewhat longer than the oscillation time of the measuring member of the balance. A further addition or removal operation can be initiated after carrying out a previous counterweight addition or removal operation only when the measuring member has come to rest again and reliably determines whether a further counterweight addition or removal operation is required.

If the balance has a plurality of possible counterweight addition or removal steps, for example fifteen steps, and the delay time between steps is 2.5 seconds, since the oscillation time of the measuring member is, for example, more than 2 seconds, then the total of the delay times alone would be 35 seconds for, for example, fourteen addition or removal steps, a circumstance which is not compatible with modern requirements. On the other hand, only 0.5 seconds, for example, would be allotted to each actual counterweight addition or removal operation, i.e. a total of 7 seconds.

Therefore, an object of the present invention is to provide in a counterbalance weight addition or removal device of the initially mentioned kind the possibility of, on the one hand, effecting in immediate succession a plurality of counterweight addition or removal operations which have to follow one another in the same direction, so that there is no loss of time, and on the other hand, preventing useless operations from being effected.

According to the present invention there is provided a counterbalance weight addition and removal device for automatic use with a balance, a control circuit being provided to control the device, which device is arranged to deposit on and lift from the balance, a plurality of counter weights in equal weight steps, the balance producing an electrical load analog signal proportional to the portion of a load on the balance not counterbalanced by counterweights, a digital indicator and four signal generators being arranged to receive said electrical signal, two of which signal generators are arranged to produce a signal for actuating the device in a manner known per se, to deposit and lift a counterweight when said electrical signal exceeds the limits of a specified range, while the other two signal generators are arranged to produce a control signal when said electrical signal has exceeded the range of a signal equivalent to a counterweight step just completed, by more than the magnitude of that range, first and second delay members being provided whose delay times are longer than the oscillation time of the balance, the first delay member being permanently connected to the input side of the signal generators defining the said specified range, and the second delay member being arranged in the control circuit so as to be operable by the device at the end of each counter weight addition or removal operation to render said device inoperative for the duration of its delay time, the second delay member being arranged to be rendered inoperative under the influence of a control signal from one of said other signal generators, to thus enable said device to then remain continuously operable.

In the first instance, the "specified range" referred to can, in a known manner, be greater than the range of each counterweight step, whereby overshooting of the measuring member of the balance beyond the limits of the counterweight addition or removal step which has been just completed has no influence on the counterweight addition or removal operations when the load analogue signal, i.e. electrical signal, has not yet exceeded the limits of the "specified range".

The first delay member prevents counterweight addition or removal operations from being initiated before the measuring system of the balance has assumed a steady state (i.e. the oscillations of the balance due to the removal or addition of weights has died away. In this respect, a delay time has to be tolerated in order to avoid the possibility of the first addition or removal operation initiated being rendered futile. The second delay member prevents a further counterweight addition or removal operation from immediately following a counterweight addition or removal operation which has just been completed. Without further measures, this would result in the occurrence of a delay time of, for example, 2.5 seconds between two consecutive weight addition or removal operations. This is now prevented for the majority of the counterweight addition or removal operations by the said other signal generators, one of which produces a control signal provided that the load analogue signal (i.e. said electrical signal) is still located a relatively great distance outside the range of the signal corresponding to the counterweight addition or removal step which has just been completed. The second delay member is bridged for the duration of the control signal, and the counterbalance weight addition or removal device continues to operate in an unimpeded manner until the control signal ceases. The second delay member then comes into operation after the counterweight addition or removal operation in progress has been terminated, and interrupts the operation of the device for the duration of the delay time. When the delay time of the second delay member has expired, the measuring member of the balance has reached its rest position and now reliably indicates whether or not a further counterweight addition or removal operation is required to bring the load analogue signal within said "specified range". If a further counterweight addition or removal operation is required, this addition or removal operation is initiated after the delay time has expired.

The "measuring member of the balance" generally refers to a balance beam, although it refers to a spring in special cases. In the case of a beam balance whose measuring member can swing freely, the term "specified range" refers to the range of deflection of the measuring member, particularly the range of inclination of the beam or the range of the scale. The terms "range of scale", or "range of inclination" cannot be used in the case of a balance whose measuring member is prevented from moving freely by an electronic measuring system. Such balances also produce output signals a long way outside the range of a counterweight step, except that these output signals become increasingly inaccurate with increasing distance from the ends of the range of the counterweight step and are thus no longer strictly proportional or analogous to the load.

In an advantageous development of the present invention an electronic measuring system is provided on the balance, which system prevents deflection of the measuring member of the balance except for a small residual amount and produces said electrical signal (i.e. load analogue signal). A digital voltmeter is arranged to receive said electrical signal and the two signal generators defining said "specified range" are contacts arranged in the digital voltmeter and controlled thereby. The first delay member may also be a component part of the digital voltmeter.

In the case of a beam balance whose beam is normally deflectable, it is possible to provide, on a projected scale outside the range of the scale, contacts which represent the signal generators defining said "specified range", and which can actuate the counterbalance weight addition or removal device, whereas the conditions are different in the case of a scale of the type under consideration whose measuring member is prevented from moving freely by the electronic measuring system. The remaining movement of the measuring member is so small that it cannot be used to produce signals when exceeding the "range". Thus, in order to avoid these difficulties, the signal generators can be in the form of contacts which are controlled by a digital voltmeter connected to the balance.

The digital voltmeter indicates only the portion of the load not counterbalanced by counterweights. These counterweights are, for example, the last four weight positions. On the other hand, the portion of the load counter-balanced by the counter weights is indicated by the counterbalance weight addition or removal device itself; these are the first weight positions. The total range of measurement of the digital voltmeter (DVM measuring range) corresponds to the "specified range" mentioned above. If the digital voltmeter has a so-called "over-run" (i.e. the voltmeter range is larger than and includes the "specified range", the "over-run" being the range between the limits of the "specified range" and the "digital Voltmeter measuring range", it can indicate, for example, 10 or 30 percent above and below the range of a counterweight step. If the digital voltmeter is provided with contacts which can be actuated when a signal (i.e the load analogue signal in the present instance) fed to the digital voltmeter reaches the ends of the over-run range, i.e. the ends of the DVM measuring range, these contacts can be used as the signal generators of the present invention, which define said "specified range".

In principle, it would be possible to provide the said other signal generators on the digital voltmeter itself, but only when digital voltmeters are available which still have an over-run range of approximately 100 percent available at each end of the range of a signal corresponding to a counterweight step. Since this is normally not the case, a threshold value circuit, such as a window discriminator, may be provided in a further development of the present invention, the outputs of the threshold value circuit constituting the said other signal generators.

Figure 2:
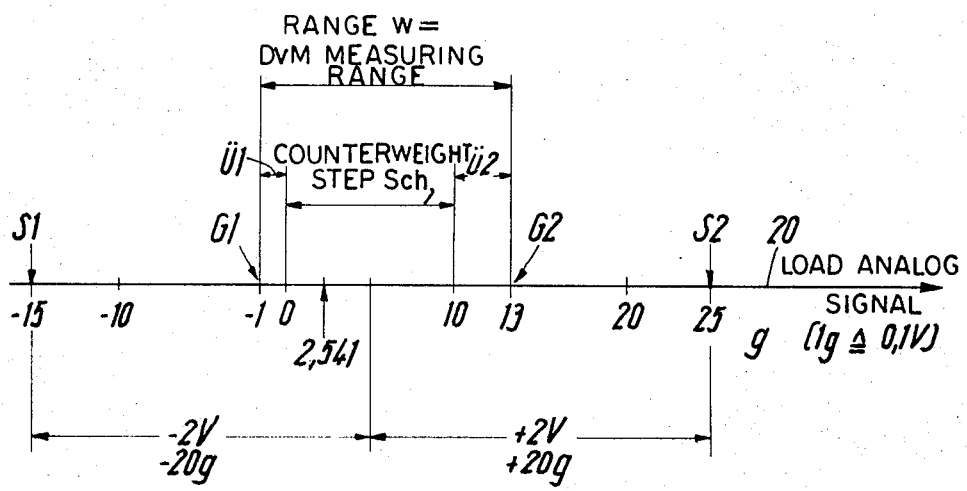

The present invention will now be further described, by way of example, with reference to the accompanying drawings, in which:

FIG. 1 illustrates diagrammatically a window for indicating weight, as used in one embodiment of the present invention, FIG. 2 is a diagrammatic illustration showing the triggering points of signal generators arranged according to the present invention relative to a single counterbalance weight step, FIG. 3 is a diagrammatic illustration of a circuit constructed according to the present invention and suitable for controlling a motor for depositing or lifting counterbalance weights, FIG. 4 is a table indicating the states of various components in the circuit of FIG. 3, and FIG. 5 is a table indicating the state of a further component of the circuit of FIG. 3 for different load analogue voltages.

The present invention will be hereinafter described with reference to its use with a beam balance having 15 possible counterbalance weight steps, each of 10 grams. The balance has an electronic indicating system such as is described, for example, in the Applicant's German Auslegungschrift No. 1 549 280. This system allows only slight tilting of the balance beam. The system produces a direct current which is strictly proportional to the portion of the load not counterbalanced by the weights within the range of weighing of the balance. The balance including the electronic system, is shown by block 1 in FIG. 3. An output current $i$ produced by the electronic system flows through a fixed resistor 3, so that a load analogue is established i.e. load analogue signal at a point 5 relative to earth, and is proportional to the portion of the load not counter-balanced by the counter-weghts. The load analogue voltage is, for example, 0.1 V per gram. The load analogue voltage is fed to the digital voltmeter 7 and is translated into a visual representation in the form of numbers.

FIG. 1 shows the weight indicating windows which are generally designated 10 and include digit windows 11 to 16. A numeral indicator unit is mounted behind each window. The numeral indicating units 13 to 16 are fed from the output of the digital voltmeter. On the other hand, the first two numeral indicator units are fed directly from the counterbalance weight addition or removal device of the balance i.e. these two units indicate the actual counter weight located on the balance. In order to show this more clearly, a double separating line (not provided in the actual device) is shown between the windows 12 and 13. The decimal point is located between the windows 13 and 14. When, for example, 70 grams are provided by the counterbalance weight device, the digit 7 appears in the window 12, while the windows 13 to 16 show zeros in the first instance. The provision of the 70 grams counterbalance will cause the beam to oscillate and as soon as the oscillation has died away (assuming a steady state is then attained) and after the expiry of the delay time of the digital voltmeter, the weight not counterbalanced is indicated in windows 13 to 16, the first window 13 indicating whole grams and the following windows indicating decimal parts of a gram.

FIG. 2 shows the triggering points of the signal generators. Weights are plotted in grams on a horizontal straight line 20, a load analogue signal voltage of 0.1V. corresponding to each gram. A counterbalance weight step Sch embraces a range of 10 g, the "range" W, which is equal to the total measuring range of the digital voltmeter i.e. the DVM measuring range, being greater than a single counterbalance weight step. The total measuring range of the digital voltmeter includes an additional 3 grams on the positive side of the step Sch and an additional 1 g, on the negative side, i.e. it extends from $-1$g.to $+$ 13 g. When the load analogue signal exceeds the ends of the DVM measuring range, the signal generators G1 and G2 come into operation. The signal generators S1 and S2, which render a second delay member inoperative, are arranged a relatively great distance outside the limits of the DVM measuring range, namely at a distance of $\pm$ 2V or $\pm$ 20 g. from the centre of the DVM measuring range.

A load analogue signal corresponding to a weight of 2.541 grams is shown within the actuating weight steps Sch in FIG. 2. When the total load is 72.541 g., the counterbalance weight device indicates a digit 7 directly in the window 12, so that the total reading is that shown in FIG. 1.

A counterbalance weight addition or removal operation is not triggered if the load varies only to an extent where the load analogue signal remains within the DVM measuring range W. If the load analogue signal assumes a value within the over-run region U1 or U2 (i.e. outside the range of the actuating weight step Sch, but still within the DVM measuring range W), the digital voltmeter correctly indicates the weight not counterbalanced, in the windows behind the double line 18 in FIG. 1. A false reading would however appear in the window 12, since a necessary counterbalance weight addition or removal operation is not triggered. An electrical circuit, which is not shown but which is known per se, does however ensure that the numeral indicator unit associated with the window 12 is switched higher or lower by one position as required, in such an event.

If the load is varied to an extent where the load analogue signal exceeds the limits of the DVM measuring range W, one of the contacts G1 or G2 in the digital voltmeter is actuated after the delay time of a first delay member which is a component part of the digital voltmeter, so that the counterbalance weight device is triggered causing a counter weight to be then deposited or raised from the beam balance. If, after the oscillation of the beam balance due to the change in the counterbalance weight, the load analogue signal comes to rest in the range between G1 and S1 or between G2 and S2, the second delay member then comes into operation, so that a delay time is awaited in the first instance, until the next counterbalance weight addition or removal operation is initiated.

However, if the load on the beam balance has been varied to such an extent that the load analogue signal assumes a value below S1 or above S2, the delay time of the first delay member is also awaited in the first instance until counterbalance weight addition or removal operations are actually initiated. However, a plurality of counterbalance weight addition or removal operations then take place one after the other until the load analogue signal assumes a value between S1 and S2. Everything else then takes place in the manner described above.

A motor for depositing or raising counterbalance weights from the beam balance is designated 25 in the circuit diagram in FIG. 3. An operating voltage of +12 volts can be applied to the motor 25 by way of contacts $a2$ and $b2$ for clockwise or anti-clockwise running, the motor being inoperative when the contacts are in the illustrated position. The motor runs in one direction of rotation if only contact $a2$ is actuated. On the other hand, the motor runs in the other direction of rotation if only contact $b2$ is actuated and contact $a2$ is left in the illustrated position. In one case, the motor deposits the counterbalance weights and, in the other case, lifts the counterbalance weights.

The contacts provided in the digital voltmeter for triggering a counterbalance weight addition or removal operation, are designated G1 and G2. The top ends of these contacts (as illustrated in FIG.3) are connected by way of a common lead 27 and a manual switch 28 to two parallel-connected electronic switches 30 and 32. The other sides of these switches (30,32) are connected to the operating voltage of + 12V by way of a lead 33. To facilitate comprehension, the electronic switches 30 and 32 are shown as blocks provided with a switch symbol. They may be provided by transistors or, in the case of skilled circuit design, by a single transistor. The two electronic transistors are actuated by control signals fed thereto (for example to their transistor bases) by way of leads 34 and 36.

The counterbalance weight device (not illustrated) which deposits or lifts a weight (10 grams) from the beam balance is driven by the motor 25 and when the device is operating a switch U closes, the switch U being open provided that the counterbalance weight device is in its normal or rest state. The switch U is closed shortly after the motor 25 has commenced running in one direction of rotation or the other, and is opened only after an operation of depositing or lifting a counterbalance weight from the beam balance has been concluded. The bottom end of the switch U as illustrated in FIG. 3 is connected by way of a line 38 to the input of the second delay member V2 which has a delay time of 2.5 seconds. This delay member includes an RC timing member whose capacitor 41 is discharged when the contact U closes. When the capacitor 41 is discharged, the delay member V2 supplies by way of the lead 34 a control signal which maintains the electronic switch 30 in an open state. The conditions are shown in the table in FIG.4. When the contact U is opened after expiry of a counterbalance addition or removal operation, and the motor 25 is stationary again, elements (not illustrated) of the second delay member V2 commence to charge the capacitor 41. The capacitor has attained its switching voltage after 2.5 seconds, whereby a signal is produced by way of the lead 34 and opens the electronic switch 30 and, when the switch 32 is open, interrupts the supply of current from the lead 33 to the contact G1 and G2.

The bottom ends of the contacts G1 and G2 lead respectively to relay windings B and A whose other ends are connected to the earth lead 44. In FIG.3, relay windings are shown in capital letters and the associated contacts are shown in small letters, a plurality of contacts being numbered consecutively. Diodes, which by-pass the relay windings in a known manner in order to protect the semiconductors of the circuit, have been omitted. The top ends of the relay windings A and B as illustrated in FIG.3 are connected to respective contacts of a change-over switch $c2$ whose contact arm is connected to the bottom end of the change-over switch U by way of a diode 46. The relay windings A and B actuate the contacts $a2$ and $b2$, already described, for reversing the running direction of the motor 25, and contacts $a1$ and $b1$ which operate a relay winding $c$ in the illustrated manner. This relay winding $c$ operates the contact $c2$ and a contact $c1$ connected in series with the contact $a1$.

The arrangement described above operates as follows:

When the circuit is in the illustrated state, the electronic contact 30 is closed owing to the expiry of the delay time of the delay member V2. The circuit is put into operation by closing the manual switch 28. When the DVM measuring range W is exceeded downwardly by a small amount, the contact G1 provided in the digital voltmeter is closed after the expiry of a delay time of 2.5 seconds of the first delay member V1, so that the relay B is energized, whereby contact $b1$ is closed, the relay C is energized and its contact $c1$ is opened and its contact $c2$ is changed over. The contact $b2$ has also been changed over by the relay B. The motor 25 starts and, shortly afterwards, closes the contact U. Current is thereby applied to the relay B by the lead 33 by way of contact U, diodes 46 and contact $c2$. Thus, the relay is self-holding, provided that the contact U is closed. As may be seen from the table in FIG.4, the electronic switch 30 is opened by closing the contact U. However, this is of no importance since the relay B receives current by way of the contact U.

The contact U opens when a counterbalance weight addition or removal operation has been completed, whereby the supply of current to the relay B is interrupted, since the electronic switches 30 and 32 are now open. The relay B is released, the contact $b2$ is changed over and the motor 25 is switched off. The contact $b1$ opens and switches off the relay C, so that the contacts $c1$ and $c2$ again assume their illustrated positions.

By opening U (i.e. after motor 25 stops), a delay operation of, for example 2.5 seconds duration has been initiated in the delay member V2. The electronic switch 30 thus remains open for as long as this delay operation continues, so that no further counterbalance weight addition or removal operations can be initiated during this period, not even when one of the switches G1 or G2 is closed. The electronic contact 30 closes again only after the delay time has expired. The circuit is now ready to carry out a further counterbalance weight addition or removal operation.

If the contact G2 of the digital voltmeter is closed by the DVM measuring range W being slightly exceeded towards the other side, the relay A is energized and its contact $a2$ puts the motor into operation in the opposite direction of rotation. The contact $a1$ opens and switches off the relay C, so that the contact $c2$ of the relay C remains in the illustrated position. When the motor 25 has started, the relay A receives current by way of the contact U which is then closed, and the relay A holds itself, while the electronic switch 30 is opened again. The rest of the operation takes place in the manner described above.

The relay C has the function of a storage relay. It is intended to ensure that the motor starts again in its original direction of rotation if the operation of the motor is accidentally interrupted. Thus, the motor is forced to maintain its direction of rotation after the contact U has closed until U is opened again.

The circuit described thus far would impose a pause of 2.5 seconds after each counterbalance weight addition or removal operation of 0.5 seconds, so that the addition or removal of several weights to the beam balance would take up a considerable amount of time.

In order to avoid this, there is provided a window discriminator generally designated 50 and comprising two operational amplifiers S1 and S2. The load analogue voltage is fed from point 5 to the input of the operational amplifiers S1 and S2 by way of a low-pass filter 54 and a further operational amplifier 56. The low-pass filter 54 is intended to render harmless variations in the load analogue voltage which occur when counterbalance weights are deposited or lifted abruptly. The low-pass filter allows only frequencies to pass which are somewhat below 10 Hertz and which are determinative for variations in the load analogue voltage.

The operational amplifier 56 serves as an impedance transformer and ensures that a very high resistance (e.g. at least $10^4 \times$ value of resistor 3) is connected as an input to the window discriminator 50, in parallel with the fixed resistor 3 on which the load analogue voltage appears. Fluctuations of this input resistance under the influence of variations in temperature of the semiconductors of the operational amplifiers can then have no appreciable influence on the input voltages fed to the window discriminator.

The function of the window discriminator is to prove control signals when the load analogue voltage assumes a value which is at an adequate distance from the ends of the counterbalance weight step Sch, namely outside S1 or S2 in FIG.2. The two operational amplifiers S1 and S2 are set so that they each produce an output signal when the load analogue voltage has exceeded the value S1 or S2 in FIG.2. The so-called window voltage, namely the difference between the potentials S1 and S2 of the load analogue voltage, can be, for example 4 volts, namely ± 2 volts from the centre of the counterbalance weight step Sch.

When the window voltage is exceeded to one side or the other with a variation in the load, one of the operational amplifiers S1 or S2 produces a signal. The electronic switch 32 is then closed and the electonic switch 30 is thus by-passed, the delay member V2 being thus rendered inoperative. A counterbalance weight addition or removal operation can then be followed directly by further counterbalance weight addition or removal operations without a pause occurring therebetween.

If the analogue voltage lies within the window voltage either from the outset or after one or more counterbalance weight addition or removal operations have been carried out, neither of the operational amplifiers S1 or S2 produces a signal, and the electronic switch 32 remains open. This is the case when the variation in load is only small and a further counterbalance weight addition or removal operation has to be prevented from immediately following such a previous operation.

We claim:

1. A counterbalance weight addition and removal device for automatic use with a balance, a control circuit being provided to control the device, which device is arranged to deposit on and lift from the balance, a plurality of counter weights in equal weight steps, the balance producing an electrical load analog signal proportional to the portion of a load on the balance not counterbalanced by counterweights, a digital indicator and four signal generators being arranged to receive said electrical signal, of which first and second signal generators are arranged to produce a signal for actuating the device to deposit or lift a counterweight when said electrical signal exceeds the lower or upper limits, respectively of a specified range, while the third and fourth signal generators are arranged to produce a control signal when said electrical signal has exceeded a signal range equivalent to a counterweight step just completed, by more than the magnitude of that range, first and second alternatively operating delay members being provided whose delay times are longer than the oscillation time of the balance, the first delay member being permanently connected to the first and second signal generators, and the second delay member being arranged in the control circuit so as to be operable by the device at the end of each counter weight addition or removal operation to render said device inoperative for the duration of its delay time, the second delay member being arranged to be rendered inoperative under the influence of a control signal from one of said third and fourth signal generators, to thus enable said device to then remain continuously operable.

2. A counterbalance addition or removal device according to claim 1, wherein an electronic measuring system which prevents deflection of the measuring member of the balance except for a small residual amount and which produces the said electrical load analog signal, is provided on said balance, a digital voltmeter is arranged to receive said load analog signal, and the first and second signal generators are contacts arranged in the digital voltmeter and controlled thereby, the first delay member being also a component part of the digital voltmeter.

3. A counterbalance weight addition or removal device according to claim 2, wherein the said second and third signal generators are also provided in the digital voltmeter and are contacts controlled thereby.

4. A counterbalance weight addition or removal device according to claim 2, wherein the said third and fourth signal generators are component parts of a threshold value circuit.

5. A counterbalance weight addition or removal device according to claim 4, wherein a window discriminator forms the threshold value circuit, the window voltage being limited by the two threshold values.

* * * * *